(12) United States Patent
Dumas

(10) Patent No.: US 6,902,046 B1
(45) Date of Patent: Jun. 7, 2005

(54) HIGH PERFORMANCE SPRAG CLUTCH ASSEMBLY

(75) Inventor: Andrew D. Dumas, Bellows Falls, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/378,428

(22) Filed: Mar. 3, 2003

Related U.S. Application Data

(60) Provisional application No. 60/365,911, filed on Mar. 21, 2002.

(51) Int. Cl.[7] .............................................. F16D 41/06
(52) U.S. Cl. .................................................. 192/41 A
(58) Field of Search ........................... 192/41 R, 45.1, 192/41 A; 188/82.8; 60/345

(56) References Cited

U.S. PATENT DOCUMENTS

| | | | | |
|---|---|---|---|---|
| 3,473,327 A | * | 10/1969 | Szodfridt ..................... | 60/362 |
| 4,009,570 A | * | 3/1977 | Ohkuoo et al. ............... | 60/341 |
| 5,415,258 A | * | 5/1995 | Numata ..................... | 192/41 A |
| 5,632,363 A | * | 5/1997 | Kubo et al. ................. | 192/45.1 |
| 5,642,795 A | * | 7/1997 | Miura et al. ................. | 192/45.1 |
| 5,718,314 A | * | 2/1998 | Muramatsu et al. ........ | 192/45.1 |
| 5,760,514 A | | 6/1998 | Taniguchi et al. ............ | 310/92 |
| 5,779,014 A | | 7/1998 | Kinoshita et al. ......... | 192/41 R |
| 5,881,556 A | | 3/1999 | Matsuoka ..................... | 60/339 |
| 6,026,642 A | | 2/2000 | Myers ......................... | 60/345 |
| 6,481,549 B2 | | 11/2002 | Kroll et al. ............... | 192/41 R |

* cited by examiner

*Primary Examiner*—Saul Rodriguez
(74) *Attorney, Agent, or Firm*—Clifford F. Rey

(57) ABSTRACT

A high performance sprag clutch assembly and replacement system for a land motor vehicle transmission, which utilizes a commercially available sprag assembly popular among high performance enthusiasts in combination with newly manufactured inner and outer races to achieve the maximum rated torque capacity is disclosed. The outer race and stator end cap components have been designed to reduce the overall axial length to adapt the sprag clutch assembly to the limited axial space within the stator component of the torque converter of various transmissions. The interlocking stator caps function to reduce race eccentricity under load to ensure that each individual sprag element carries the torque equally to prevent the sprag elements from being rolled over in operation causing severe damage. A plurality of interchangeable inner races adapt the present sprag clutch system for use with GENERAL MOTORS, FORD, and CHRYSLER transmission input shaft configurations.

17 Claims, 9 Drawing Sheets

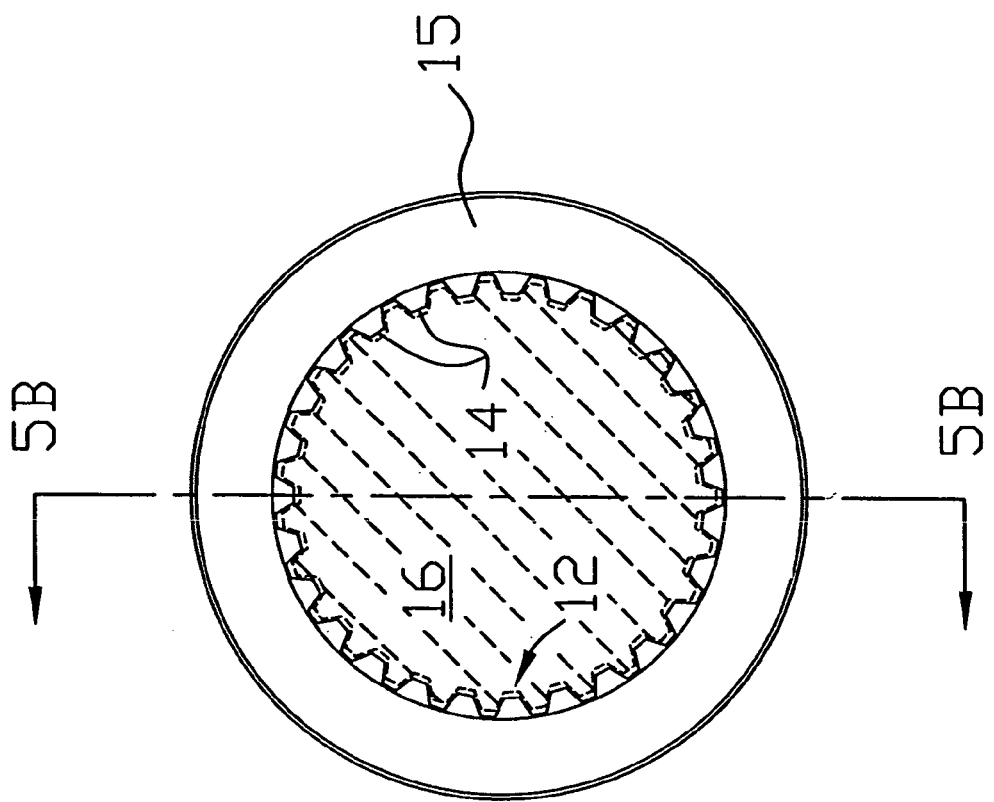

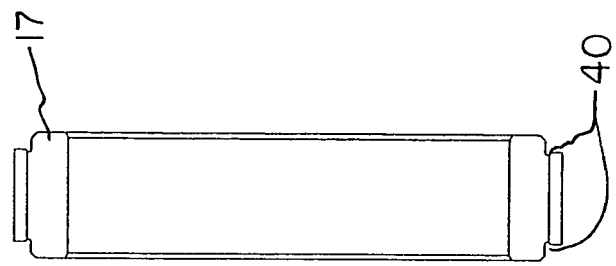
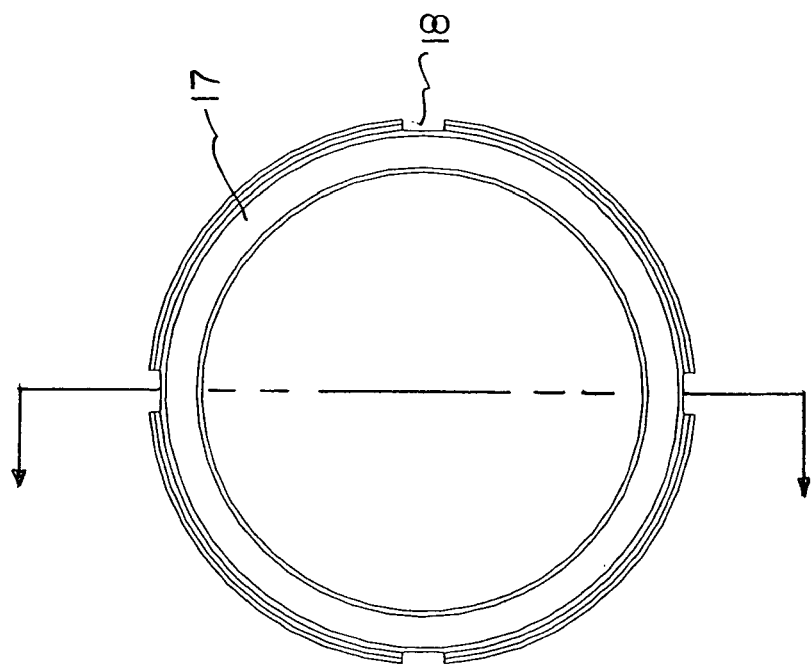

HIGH PERFORMANCE SPRAG CLUTCH ASSEMBLY

CROSS-REFERENCE TO RELATED APPLICATIONS

This application claims the benefit under 35 U.S.C. 119(e) of U.S. Provisional Patent Application No. 60/365,911 filed Mar. 21, 2002, entitled Improved Sprag Clutch Assembly.

BACKGROUND OF THE INVENTION

The present invention relates to the field of one-way clutches for use in land motor vehicles and, more particularly, to a high performance sprag clutch assembly for use in the torque converter stator of an automatic transmission.

The original concept of the sprag clutch was developed in the late 1940s. Since that time sprag clutches have been used as driving members in many automatic transmissions worldwide. Sprag clutches are a specific class of one-way clutches. The unique feature of one-way clutches is that they can maintain high torque capacity in one direction and no torque capacity in the other direction.

The geometric design characterizing sprag clutch operation basically involves unidirectional wedging of the surfaces of multiple-cam structures denoted as dogleg sprags or sprag elements between two races, which enclose the sprags. The primary role of the sprag clutch in the present application is to allow the stator component within a torque converter in an automatic transmission to be driven by the torque converter in only one direction. This occurs at high load conditions during which the sprag elements are wedged in the drive mode to prevent relative motion between the inner and outer races. In this mode and during the transition to engagement, the wedged sprags transmit torque from the outer race to the inner race of the clutch.

Reliable sprag clutch operation requires a number of contributing design factors. (1) The clutch design must force all of the sprags to work together in phase throughout their operating range (so-called "phasing") such that the sprags equally share the load within small tolerance variations. (2) All sprags should be individually energized, axially aligned, and as free as possible of parasitic friction that subtracts from the normal energizing forces. (3) Adequate race proportions, concentricity, material, heat treatment, and surface finish are essential. Thus, the clutch is no better than the races used in its fabrication. (4) The clutch must be adequately lubricated. Lubrication requirements will vary significantly depending on application details.

The typical problem in sprag clutch design is to achieve the greatest possible torque capacity in a minimum of space. Maximum and minimum sprag lengths are usually governed by practical considerations. For example, the maximum length is limited by the ability to heat-treat without distortion; and the minimum length is governed by the division of the axial space available between sprag and the energizing means (i.e. cages).

There are several known prior art patents that are available in the field and their discussion follows. One example of a prior art one-way clutch is disclosed in U.S. Pat. No. 5,779,014 to Kinoshita et al., which teaches a one-way clutch mounting structure including an outer ring, an inner ring and a plurality of clutch members interposed between the inner and outer rings. In this one-way clutch the outer ring is mounted in a housing, which is part of a stator. The housing has an annular section and a side section, which together define a pocket wherein the outer ring is mounted. The outer ring includes a spiral engaging means providing an integrated structure between the stator housing and the outer ring.

Another example of a prior art one-way clutch for a torque converter is disclosed in U.S. Pat. No. 5,760,514 to Taniguchi et al., which provides a one-way clutch for a plastic stator capable of preventing the inner circumferential surface of the outer ring of the one-way clutch from being deformed during shrinkage of the plastic stator in the manufacturing process. Thus, the outer ring integrally formed with the plastic stator is not required to be further machined after the integration, which reduces production costs.

U.S. Pat. No. 6,481,549 to Kroll et al. discloses an overrunning clutch for a torque converter wherein the stator consists of glass reinforced plastic which is injected around the overrunning clutch outer ring so that machining of the outer ring is no longer necessary after integration in the stator.

U.S. Pat. No. 5,881,556 to Matsuoka discloses a stator for a torque converter with thrust supporting structures without using a thrust bearing on at least one axial end thereby facilitating reduction of the axial dimensions thereof.

While these devices fulfill their respective, particular objectives and requirements, the aforementioned patents do not disclose the high performance sprag clutch assembly of the present invention, which substantially departs from the conventional concepts and designs of the prior art.

SUMMARY OF THE INVENTION

Accordingly, the present invention is a high performance sprag clutch assembly, which utilizes a standard, commercially available sprag assembly in combination with the newly manufactured inner and outer races of the present invention to achieve the maximum rated torque capacity and to minimize manufacturing costs. The present outer race and stator cap components have been designed to reduce the overall axial length of the sprag clutch assembly in order to adapt a BORG WARNER (Part No. 27306 AM) sprag assembly, which is popular among racing enthusiasts, to the limited axial space within the stator component of the torque converter. Interlocking stator caps function to reduce eccentric loading of the races in operation to ensure that each individual sprag element carries the torque equally and to prevent the sprag elements from being rolled over in operation. A plurality of interchangeable inner races having different internal spline configurations adapt the present sprag clutch assembly for use with various transmission shafts including twenty-seven-tooth spline shafts, thirty-two-tooth stator support shafts, and various other shaft spline configurations utilized in GENERAL MOTORS, FORD, and CHRYSLER transmissions.

There has thus been outlined, rather broadly, the important features of the present invention in order that the detailed description thereof that follows may be better understood, and in order that the present contribution to the art may be better appreciated.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 5A is an elevational view of the inner race of the present sprag clutch;

FIG. 6A is an elevational view of the outer race of the present sprag clutch;

FIG. 6B is a cross-sectional view of the outer race taken through the section line 6B—6B of FIG. 6A;

DETAILED DESCRIPTION OF THE PREFERRED EMBODIMENTS

Figure 1:
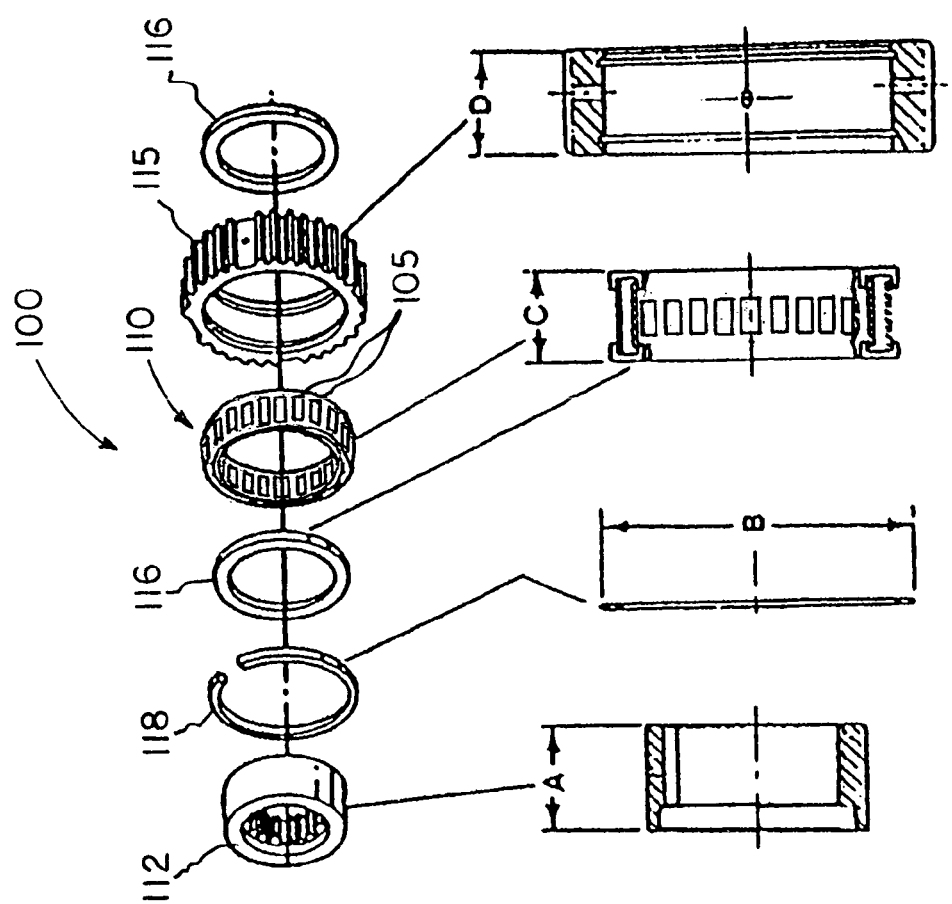
FIG. 1 is a composite view illustrating the components of a typical sprag clutch labeled Prior Art.

Prior to describing the present invention in detail it may be beneficial to briefly review the structure and function of a typical sprag clutch in an automatic transmission. With reference to the drawings there is shown therein a sprag clutch in accordance with the prior art, indicated generally at 100 and illustrated in FIG. 1.

The primary components of the sprag clutch 100 consist of the sprag assembly, indicated generally at 110, an inner race 112, an outer race 115, two end bearings 116, and two retaining rings 118 (only one shown). The sprag assembly 110 typically consists of a plurality of sprag elements or sprags 105 held in place by two concentric cages 107, 108 positioned between the inner and outer races 112, 115 as most clearly shown in FIG. 2. A stamped, spring-steel ribbon 109 located between the cages 107, 108 pre-loads the sprags 105 evenly to distribute the load during engagement. This is accomplished by spring tabs (not shown) that are formed on the spring ribbon 109 each of which is in contact with a sprag 105. The end bearings 116 and the retaining rings 118 align the sprag assembly 110 axially between the inner and outer races 112, 115.

Figure 2:
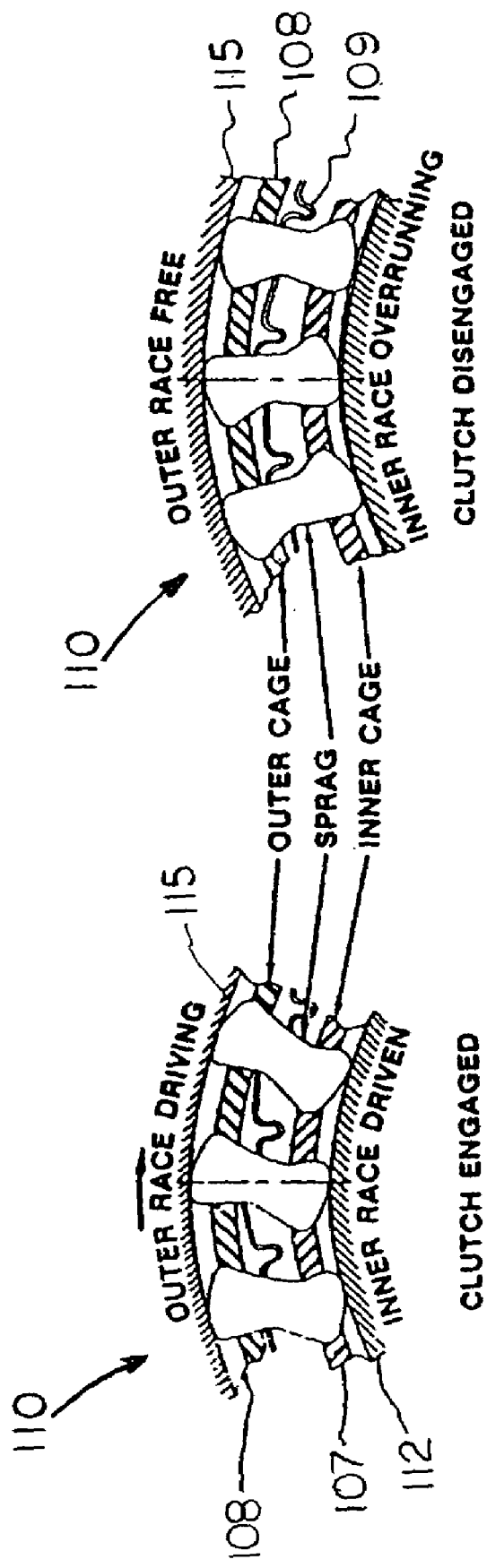
FIG. 2 is a composite diagram illustrating the sprag clutch in the drive mode (clutch engaged) and the freewheeling mode (clutch disengaged)

In most sprag clutch applications the inner race 112 overruns the outer race 115 in the same direction at about twice the outer race speed. Since no load is applied to the sprag assembly 100 in this state, this condition is regarded as freewheeling (FIG. 2 at the right). The ribbon 109 keeps each element in constant contact with the inner race 112 so that engagement and torque transfer, when required, can be both rapid and coincident for all the sprag elements 105. This occurs when the sprag elements 105 are wedged (i.e. locked) in the drive mode to prevent relative motion between the inner and outer races 112, 115 as shown (FIG. 2 at the left). In this mode and during the transition to engagement, the wedged sprag elements 105 transmit torque directly from the outer race 17 to the inner race 15.

Figure 3A:
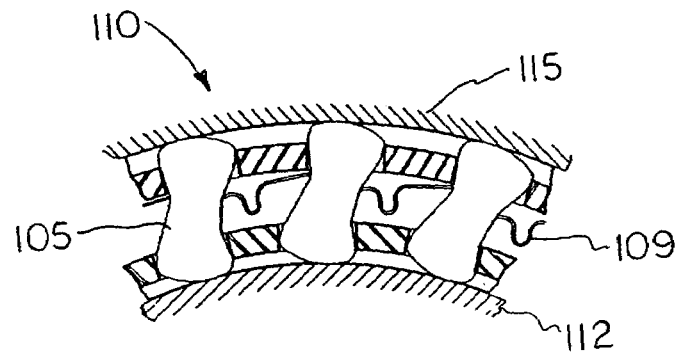
FIGS. 3A–3C show partial sections of the sprag clutch illustrating the phasing of the sprags throughout the entire operating range.
Figure 3B:
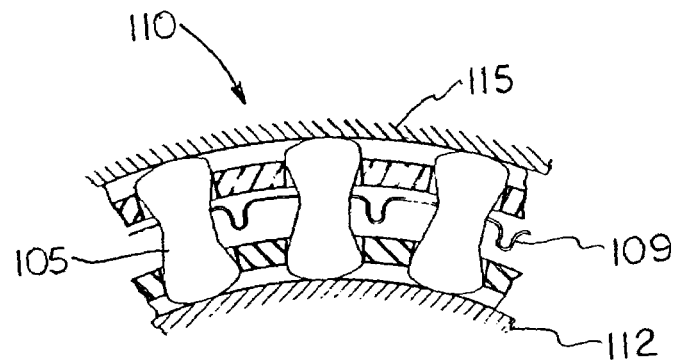
Figure 3C:
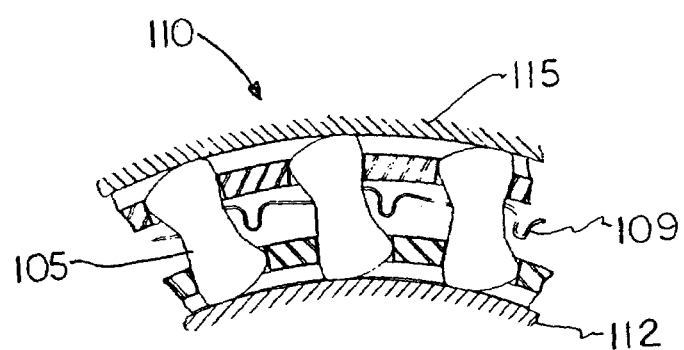

Phasing of the sprag elements 105 is achieved by the use of the two cages 107, 108 that are held concentric by their respective races 112, 115. The outer cage 108 controls the sprags 105 near their outer race contact and the inner cage 107 controls the sprags 105 near the inner race contact. By accurately sizing and spacing the cage openings wherein they are disposed, the sprags 105 can be contoured and fitted so they move in unison throughout their entire operating range. FIGS. 3A–3C show the relationship of sprags 105 and cages 107, 108 during the driven mode (FIG. 3A), transition mode (FIG. 3B), and freewheeling mode (FIG. 3C).

Thus, it will be appreciated that multiple forces act upon the sprag elements 105. In the drive mode the inner race 112 experiences the wedging force transmitted by the sprag assembly 105 from the outer race 115. In the freewheeling mode the centrifugal force acting on the sprag assembly 100 during high differential speeds tends to load the sprag elements 105 against the inner race 112, which contributes largely to the total drag force. An additional secondary force is produced by the spring tabs (not shown) acting on the sprag elements 105, which generates frictional drag on the inner race 112.

An assumption made by most manufacturers is that the clutch races 1112, 115 are precisely concentric when the sprag elements 105 first engage and begin to transmit torque. Unfortunately, this condition is not easily achieved in actual practice. Depending on the clutch, sprag element angle, and spring design, the races 112, 115 are forced into an eccentric condition and a substantial percentage of the sprag elements 105 never carry any of the torque. The few remaining load-bearing sprag elements 105 in such condition can be overloaded and rolled over causing clutch failure. The effect of the eccentric push on bearings associated with the races 112, 115 is sometimes damaging to the bearings.

One reason for the eccentric loading is that the loaded sprags 105 in the larger radial sprag space between the races have a greater cam rise per degree of rotation than the loaded sprags 105 in the smaller radial sprag space caused by the eccentricity. Thus, as the torque is increased the races 112, 115 are held eccentric or are forced into a position of greater eccentricity depending on the extent of the original offset.

Figure 4:
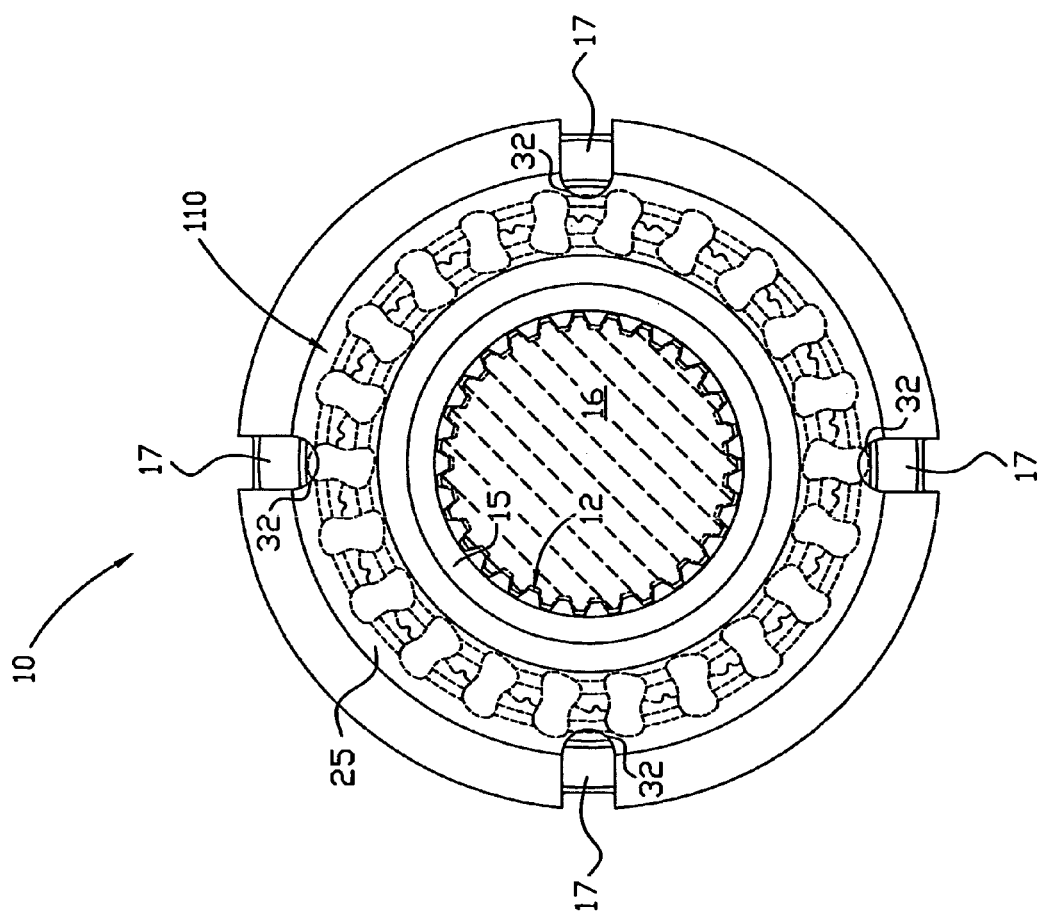
FIG. 4 is an elevational view of the improved sprag clutch assembly of the present invention.
Figure 7A:
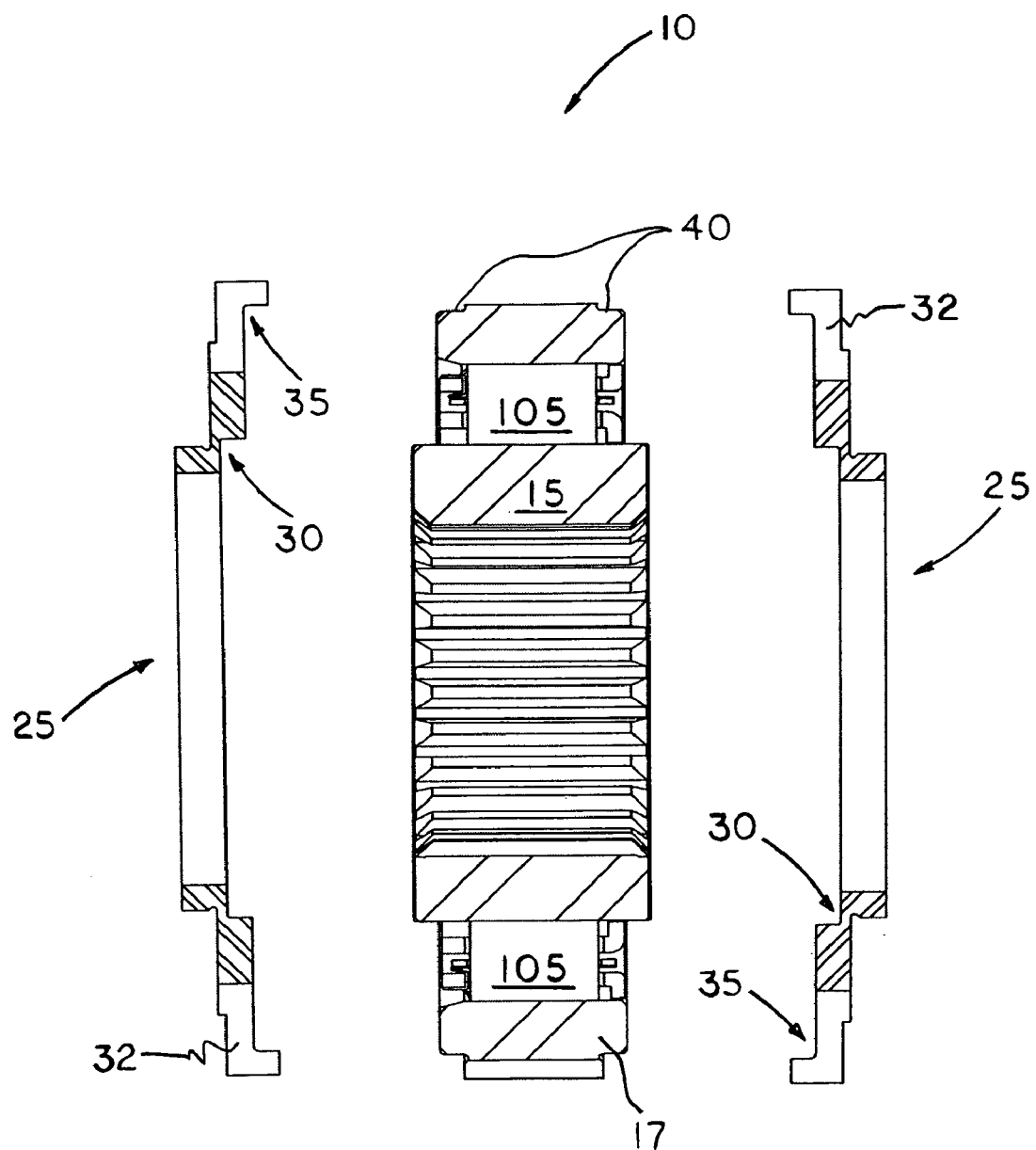
FIG. 7A is an exploded cross-sectional view of the present sprag clutch showing the details of the stator cap components.

The present invention has been developed to minimize these problems and will now be described in detail. With reference to FIG. 4 there is shown therein an improved sprag clutch in accordance with the present invention, indicated generally at 10. The sprag clutch 10 is comprised of an inner race 15, an outer race 17, a sprag assembly 110 and a pair of opposed stator caps 25 (FIG. 7A). A sprag assembly 110 manufactured under the tradename BORG WARNER (Part No. 27306 AM) or another similar sprag assembly is desirable for this purpose.

The primary role of the present sprag clutch assembly 10 is to allow the rotating, shaft-mounted stator wherein it is installed to be driven in only one direction. In the present application the inner race 15 is always stationary. The sprag clutch 10 engages (i.e. locks up) when the torque converter is loaded. When the load decreases and parasitic drag on the stator increases, the stator, which is connected to the outer race 17 freewheels.

Figure 5B:
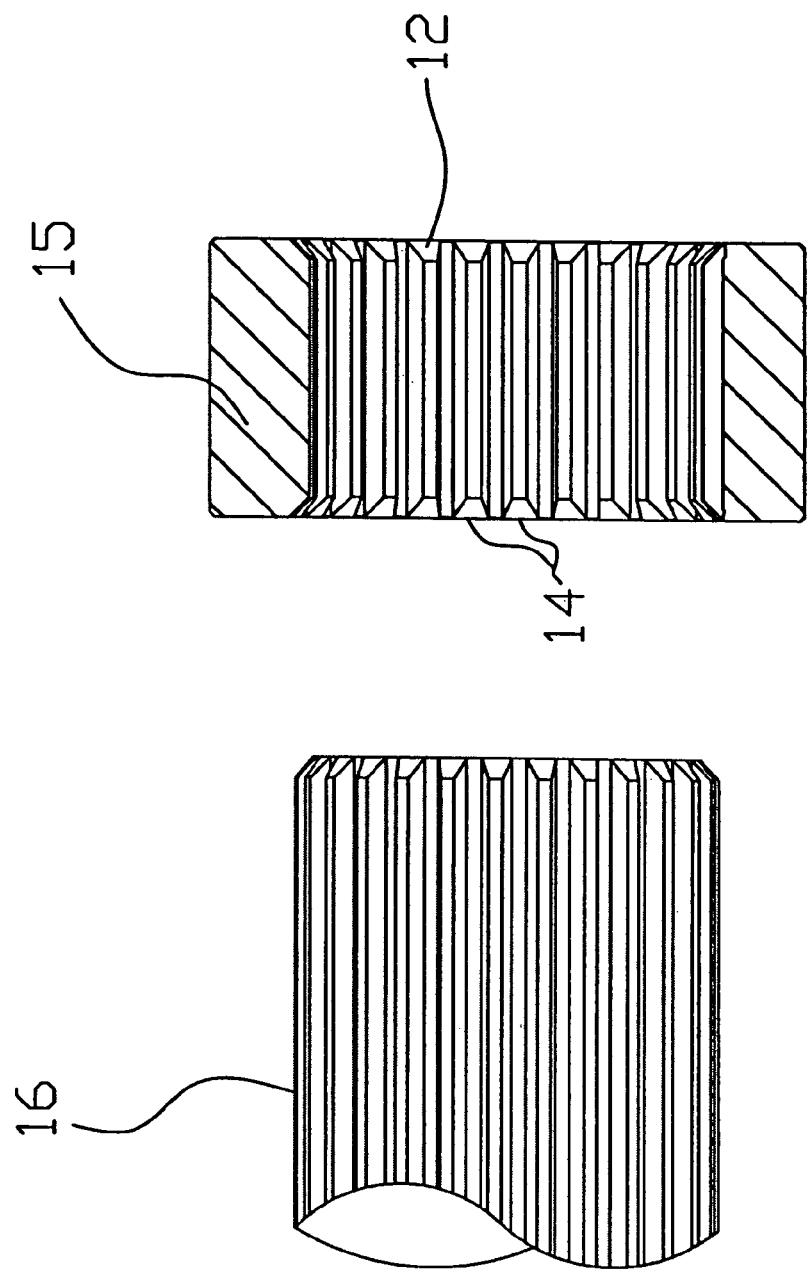
FIG. 5B is a cross-sectional view of the inner race taken along the section line 5B—5B of FIG. 5A.

In a typical embodiment the inner race 15 is a cylindrical construction including an internal spline 12 formed in the inside diameter as shown in FIGS. 5A and 5B. In the embodiment shown the internal spline 12 consists of twenty-seven teeth 14 for mating engagement with a 27 tooth spline pattern on the transmission input shaft 16 (shaft is shown withdrawn for clarification). In accordance with the present invention the inner race 15 is provided in other spline configurations so as to be interchangeable for different applications. For example, the inner race 15 is provided in alternative embodiments (not shown) adaptable to a 32 tooth stator support shafts utilized in FORD transmissions and various other spline patterns.

Referring to FIGS. 6A and 6B the details of the present outer race 17 are illustrated. The outer race 17 includes a plurality of slots 18 formed on the circumference, which engage mating key structures (not shown) formed on the inside diameter (I.D.) of the stator component to provide positive engagement and to ensure rotation of the stator during operation. As shown in cross-section in FIG. 6B, the outside diameter (O.D.) of the outer race 17 as at 40 is machined in a stepped configuration to provide interlocking engagement with the stator end caps 25 (FIGS. 7A and 7B).

The stator end caps, indicated generally at 25, are designed to secure the inner and outer races 15, 17 in coaxial alignment with the sprag assembly 110. Thus, it will be appreciated that the stator end caps 25 provide essentially the same function as the end bearings 116 and retaining rings 118 of the prior art sprag clutch 100. A plurality of oil slots 32 extending inwardly as most clearly shown in FIG. 4 provides continuous lubrication to the sprag assembly 110 and inner race 15.

Figure 7B:
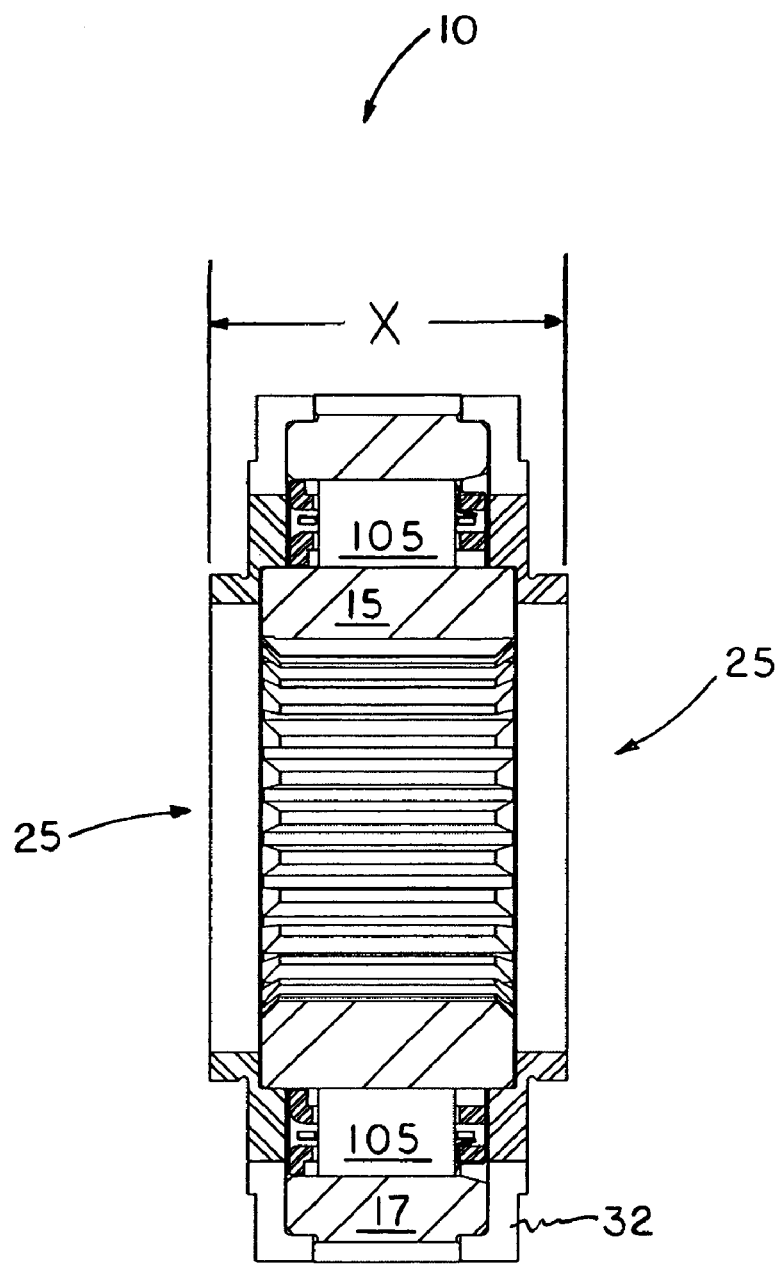
FIG. 7B is a cross-sectional view showing the components of the present sprag clutch in an assembled condition.

The counterbores 30, 35 wherein the inner and outer races 15, 17 engage the stator end caps 25 are machined to hold precise concentricity tolerances to ensure that, when the sprag clutch 10 is assembled as shown in FIG. 7B, the races 15, 17 are maintained in concentric relation. Thus, potential for eccentric loading of the inner and outer races 15, 17 and the rollover of sprags 105 is minimized.

Further, when the present sprag clutch 10 is assembled such that the inner and outer races 15, 17 are interlocked within the counterbores 30, 35 in the stator end caps 25, the overall axial length as at "X" (FIG. 7B) is reduced to a minimum to meet the space restrictions for this application.

Although not specifically illustrated in the drawings, it should be understood that additional equipment and structural components will be provided as necessary and that all of the components described above are arranged and supported in an appropriate fashion to form a complete, operative, and Sprag Clutch Assembly incorporating features of the present invention. For example, it is anticipated that the present sprag clutch assembly may be provided in a kit form including at least one interchangeable inner race for various torque converter stator applications. In addition, the present sprag clutch assembly may be included within a complete torque converter rebuild kit having other torque converter components.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A sprag clutch assembly for a land motor vehicle transmission, said sprag clutch assembly comprising:
   at least one interchangeable inner race including an internal spline having a predetermined number of spline teeth formed therein;
   a cylindrical outer race radially disposed about said inner race;
   a sprag assembly including a plurality of sprag elements, wherein said sprag assembly is disposed intermediate said inner race and said outer race; and
   a pair of stator end caps disposed in interlocking engagement with said inner race and said outer race such that said races are held in concentric relation to support unidirectional wedging of said sprag elements between said inner and said outer races said inner race and said outer race being captured within mating concentric counterbores formed in each of said pair of stator end caps, said counterbores being machined to a precise concentricity tolerance to minimize eccentric loading of said inner race and said outer race during operation.

2. The sprag clutch assembly of claim 1 wherein said sprag assembly is a commercially available BORG WARNER sprag assembly comprised of twenty-two sprag elements.

3. The sprag clutch assembly of claim 1 wherein said interchangeable inner race includes an internal spline formed therein configured for engagement with a mating external spline formed on a transmission input shaft.

4. The sprag clutch assembly of claim 3 wherein said internal spline comprises twenty-seven spline teeth.

5. The sprag clutch assembly of claim 3 wherein said internal spline comprises thirty-two spline teeth.

6. An improved sprag clutch assembly for a torque converter stator in a land vehicle transmission, wherein the sprag clutch assembly includes a plurality of sprag elements disposed intermediate an inner race and an outer race providing high torque capacity in one direction and no torque capacity in the other direction, wherein the improvement comprises:
   a plurality of interchangeable inner races, wherein each of said inner races includes an internal spline having a different number of teeth formed therein;
   a cylindrical outer race radially disposed about said inner race, wherein said outer race has a stepped cross-sectional profile having a plurality of outside diameter dimensions; and
   a pair of stator end caps disposed in interlocking engagement with said inner race and said outer race to support in-phase wedging of the sprag elements between the inner and the outer races.

7. The improved sprag clutch assembly of claim 6 wherein said sprag assembly is a commercially available BORG WARNER sprag assembly comprised of twenty-two sprag elements.

8. The improved sprag clutch assembly of claim 6 wherein said inner race and said outer race are captured within a pair of mating concentric counterbores formed in each of said pair of stator end caps, wherein said counterbores are machined to a precise concentricity tolerance to minimize eccentric loading of said inner race and said outer race during operation.

9. The improved sprag clutch assembly of claim 7 wherein at least one of said plurality of interchangeable inner races includes an internal spline configured for engagement with a mating external spline formed on a transmission input shaft.

10. The improved sprag clutch assembly of claim 9 wherein said mating internal spline comprises twenty-seven spline teeth.

11. The improved sprag clutch assembly of claim 9 wherein said mating internal spline comprises thirty-two spline teeth.

12. A method of adapting a preexisting sprag assembly for use in a unidirectional sprag clutch installed in the torque converter stator of a land motor vehicle transmission, said method comprising the steps of:

fabricating a plurality of interchangeable inner races each including an internal spline having a different number of teeth formed therein for mating engagement with a splined input shaft of a transmission;

furnishing at least one cylindrical outer race for radial placement about said plurality of interchangeable inner races;

installing a sprag assembly having a plurality of sprag elements intermediate said inner race and said outer race; and interlocking a pair of stator end caps in engagement with said inner race and said outer race such that said races are captured in precise concentric relation to support in-phase wedging of said sprag elements between said inner and said outer races resulting in high torque capacity in one direction and no torque capacity in the opposite direction.

13. The method of claim 12 wherein the step of interlocking further includes the steps of:

machining at least two concentric counterbores in each stator end cap corresponding to the dimensions of said inner race and said outer race, wherein said inner race and said outer race are engaged within said counterbores; and minimizing the overall axial length of the sprag clutch assembly to conform to a limited axial space within the torque converter stator.

14. A sprag clutch replacement system for installing a preexisting sprag assembly in the torque converter stator of a land vehicle transmission, said replacement system comprising:

a plurality of interchangeable inner races, wherein each of said inner races includes an internal spline having a different number of teeth;

a cylindrical outer race radially disposed about one of said plurality of interchangeable inner races;

a sprag assembly including a plurality of sprag elements disposed intermediate said inner race and said outer race; and a pair of stator end caps disposed in interlocking engagement with said inner race and said outer race such that said races are held in concentric relation to allow unidirectional wedging of said sprag elements between said inner and said outer races providing high torque capacity in one direction and no torque capacity in the opposite direction.

15. The sprag clutch assembly of claim 14 wherein said sprag assembly is comprised of twenty-two sprag elements.

16. The sprag clutch assembly of claim 14 wherein said inner race and said outer race are captured within a pair of mating counterbores formed in each of said pair of stator end caps, wherein said counterbores are machined to a precise concentricity tolerance to minimize eccentric loading of said inner race and said outer race during operation.

17. The sprag clutch assembly of claim 14 wherein said cylindrical outer race has a stepped cross-sectional configuration having a plurality of outside diameter dimensions, said stepped cross-sectional configuration providing a reduced axial length of said sprag clutch assembly upon interlocking engagement of said outer race with said pair of stator end caps.

* * * * *